July 12, 1960

J. BUGOSH 2,944,914

METHOD OF ESTERIFYING THE SURFACE OF ALUMINA
MONOHYDRATE PLATELETS AND PRODUCT THEREOF

Filed Aug. 17, 1959

INVENTOR
JOHN BUGOSH

BY *Albert B. Griggs*

ATTORNEY

United States Patent Office 2,944,914
Patented July 12, 1960

2,944,914

METHOD OF ESTERIFYING THE SURFACE OF ALUMINA MONOHYDRATE PLATELETS AND PRODUCT THEREOF

John Bugosh, Wilmington, Del., assignor to E. I. du Pont de Nemours and Company, Wilmington, Del., a corporation of Delaware Filed Aug. 17, 1959, Ser. No. 834,353

5 Claims. (Cl. 106—308)

This invention is directed to colloidal surface-esterified alumina monohydrate platelets and to methods for preparing the same.

Heretofore, no means has been known in the art for making high specific surface area, discrete, hydrophobic or organophilic platelets of alumina monohydrate. Alumina monohydrate has heretofore been produced (1) by thermally dehydrating an alumina trihydrate in air, water or caustic, and (2) by oxidizing amalgamated aluminum in the presence of boiling water or steam. Alumina monohydrate has been found naturally occurring in an impure massive form in bauxites, especially those found in Europe.

While dry alumina monohydrates with high specific surface areas are claimed to have been made, the area exists in the form of extremely fine pores in an otherwise relatively rigid, compact, macroscopic "lump." Such a "lump" cannot be ground down in size to particles in the colloidal range; the "lump" is not pulverulent. Such aluminas are also not hydrophobic or organophilic. In fact, some of these monohydrates absorb water readily and are used as efficient desiccants for drying organic and inorganic solids, liquids and gases. Such monohydrates are in the form of dense, agglomerated porous chunks or "clinkers," unsuitable in uses requiring a high degree of dispersion.

In contrast to these forms of alumina monohydrate crystals, those of the present invention are not only hydrophobic or organophilic but also are in a very finely divided form. These properties make the instant products useful in many new ways.

More particularly, this invention relates to colloidal hydrophobic or organophilic alumina monohydrate platelets having a very large specific surface area. These alumina monohydrate platelets can be prepared by a special conversion process from inexpensive alumina trihydrate starting materials. Each monohydrate platelet consists of a substrate upon which hydrocarbon compounds are chemically attached by reacting at least some percentage of substrate surface hydroxyl groups with hydrocarbon compounds bearing as functional groups at least one hydroxyl group. The monohydrate platelets remain separate and do not aggregate into solid lumps.

To aid in understanding the invention, reference can be had to the accompanying drawing.

Figure 1:
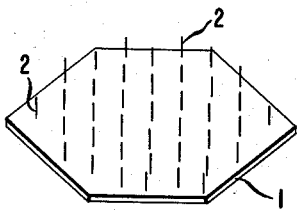
Figure 1 shows an artist's schematic conception of the appearance of individual ultimate particles of the invention partially reacted with hydrocarbon groups containing —OH groups.

The special conversion process used for preparing the monohydrate platelets of this invention from alumina trihydrate starting materials will now be outlined. Details of each phase of this process will then be described.

Briefly, an alumina trihydrate starting material is selected which has such a molecular structure, degree of hydration and particle size that the time, theta, required to depolymerize half of a measured sample in acid solution into alumina ions is less than 500 minutes at a temperature of 98° C.

If the alumina trihydrate starting material has a high free water content, it is sometimes desirable to remove a portion of this excess free water before the actual conversion process is carried out. Such water can be removed by air drying or by distillation from a non-aqueous solvent, the particular method used depending upon the structural stability of the starting material.

The suitably dry aluminum trihydrate starting material is then placed (if it is not already there) in a medium containing hydrocarbon compounds each bearing at least one hydroxyl group. Such hydrocarbon compounds can be further substituted by fluorine. Typical hydrocarbon compounds are ethanol and butanol. With these hydrocarbon compounds a diluent or inert solvent can be present.

The medium containing alumina trihydrate, hydrocarbon compound, and possibly diluent, is then heated to a temperature between 100 and 300° C. for a period of time usually lasting from 30 minutes to 6 hours, although this time factor can vary within very wide limits.

During this period alumina trihydrate crystals are dehydrated to alumina monohydrate crystals. As this dehydration takes place a structural redefinition of the alumina particles also takes place. The crystalline structure is altered and the particles change in shape and size with the result that a large increase in the number of particles and in the specific surface area occurs.

The alcohols present in the reaction medium apparently function as supports for the alumina crystal lattice during the dehydration and structural redefinition and prevents excessive shrinkage and interparticle coalescence. Prevention of shrinkage and interparticle coalescence during structural redefinition of alumina particles is believed to be the principal reason for the high specific surface area associated with products of this invention.

Concurrently with this function of crystal shrinkage and breakdown prevention, the alcohols react with crystal surface hydroxyl groups. This reaction is believed to be one of esterification wherein a hydroxyl group of an alcohol molecule combines with a hydrogen atom of an alumina surface hydroxyl group (eliminating water) so as to attach the remainder of the alcohol molecule to the surface of the alumina crystal. This can be schematically shown as follows:

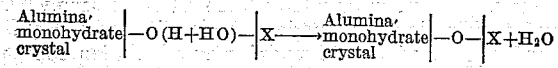

X is —$CH_2$—R and R is a substituted or unsubstituted hydrocarbon radical, as more particularly described below. Thus, hydrocarbon radicals become reacted with the surface of the alumina monohydrate particles with the result that the products have organophilic and hydrophobic characteristics.

After dehydration and structural redefinition have taken place, the products are separated from the reaction medium and, if desired, dried. The products have a surface area between 50 and 600 square meters per gram. Each platelet particle of the product has at least one dimension in the colloidal size range, and platelet substrates have the crystalline structure of boehmite as shown by X-ray diffraction patterns.

To further aid in understanding the invention, a detailed description of it is now given beginning with starting materials and ending with products. Then, before the examples, a résumé of various uses for the products is given. A detailed description of the drawings is deferred until the description of products is presented.

The starting materials

The alumina starting material used in proceses of the invention has such a molecular structure, degree of hydration, and particle size that the time, $\theta$, required to depolymerize half of a measured sample in acid into aluminum ions is less than 500 minutes at a temperature of 98° C.

This time, $\theta$, can be determined as follows:

An amount of the alumina sample equivalent to 4.8 grams of $Al_2O_3$ is weighed out. One hundred and eleven milliliters of 5.0 N HCl is heated to 98° C. Distilled water sufficient with the alumina and acid to make a total of 200 grams is measured out. The water is added to the alumina sample and the mixture is heated to 98° C. It should be noted that if the alumina sample is a very viscous gel even after addition of the water, the acid should instead be added to the alumina dispersion. The diluted alumina sample and acid are mixed, stirred and transferred to a stoppered bottle and placed in a controlled temperature bath held at 98° C. If the alumina sample is a sol or dispersion which is not stable or which is not readily prepared at a concentration such that 4.8 grams as $Al_2O_3$ can be contained in the amount of water involved in this technique, then the amounts of acid and alumina can be reduced but maintained in the same ratio as above. Ten gram samples are taken at intervals. Each is diluted to 100 grams with distilled water and quenched to 25° C. to arrest depolymerization. Each is titrated immediately with 0.5 Normal sodium hydroxide.

Instead of using 0.5 Normal sodium hydroxide, more or less concentrated sodium hydroxide solutions can be used depending upon the concentration of the alumina sample and the fraction of the sample depolymerized. The selection of a sodium hydroxide concentration for the titration follows standard analytical techniques.

One sample is taken immediately and others are taken at measured time intervals of about, say, ten or twenty minutes. If it is found that the sample is rapidly depolymerized then a special effort can be made to effect titration as soon as possible after adding the acid to the alumina and as frequently as possible thereafter. If the sample is more slowly depolymerized then the time intervals can be extended. Thus the intervals may range from a few seconds to as much as several weeks.

The titration is continued until the pH rises to about 8. The moles of sodium hydroxide used to effect neutralization between pH 3.5 and 8 is then divided by 3 to give moles of aluminum ion in the system. This type of titration is discussed in greater detail in Treadwell et al. Helvetica Chim. Acta 15 (1932), 980.

Instead of determining the concentration of depolymerized alumina ions by titration one can instead use other standard methods for determining aluminum ion concentration in the presence of polymerized alumina.

After the amount of alumina in each of the samples taken has been determined as by titration, these quantities can be plotted against time. The time required to effect depolymerization of half of the alumina can then readily be picked from the resulting graph. As has been noted briefly above, if the time intervals were not well selected in the first instance then a new set of samples should be taken over shorter periods or over longer periods as required to give a satisfactory plot. The method of plotting such data and its interpretation is further described hereafter in connection with determining $\theta$ for products of the invention.

The alumina starting materials usually have a $\theta$ value less than 500 minutes and greater than 10 minutes.

The alumina used in processes of the invention can be in the form of an aqueous dispersion. In forming such a dispersion of alumina in water, there can be used as starting materials aluminum hydroxide, or alumina gels.

In gels, alumina is always present in the aqueous system in a dispersed condition. Aluminum is associated with oxygen and is probably in some degree of hydration. In the aqueous dispersions employed in the processes of the invention, it will be associated, therefore, with oxygen, with hydroxyl, with water, and with perhaps an acid radical such as chloride. It is not feasible to determine the precise degree or character of hydration of the alumina or the mode of combination of the oxygen, the acid radical and water in the system. But the aluminum present is undoubtedly combined in some manner with oxygen for upon evaporation of the liquid and ignition of the residue, a residue of $Al_2O_3$ is obtained.

Accordingly, dispersions suitable for use according to the invention can be dried, ignited, and the $Al_2O_3$ content determined. Thus, in referring to "alumina" in the aqueous dispersions used, it will be understood that the term signifies the $Al_2O_3$ content as so determined and not that the aluminum in the dispersions is necessarily present as the specific compound $Al_2O_3$. Therefore, in speaking of the alumina as dispersed in an aqueous system, it will be understood that this term is used to include suspensions of highly hydrated alumina such as precipitated aluminum hydroxide. Also, precipitated aluminum hydroxide which has been washed to remove salts can be used as a starting material in the present invention.

An alumina particularly well suited for use in processes of the invention can be prepared by precipitating a basic aluminum carbonate by the addition of a sodium carbonate solution to a solution of an aluminum salt. The resulting aluminum hydroxide gel contains $CO_2$ which can be displaced by heating, or, more easily, by heating after addition of a small amount of an acid such as hydrochloric or nitric.

There can additionally be used as starting materials dispersions of crystalline aluminas. It is noted that crystalline alumina can be regarded as "polymerized" alumina. By analogy with organic systems or the polymerization of the silica system, small units of the aluminum-oxygen compounds present can be joined together to form relatively large molecules and micelles. In such alumina polymers, the ultimate units are joined by chemical bonds rather than by weak physical forces.

As an example of an alumina which can be depolymerized rather rapidly, there can be named the alumina trihydrates known as gibbsite and bayerite which are acid soluble varieties of crystalline hydrated alumina.

Suspensions of alumina trihydrate of the type known commercially as Bayer hydrate and having a value of $\theta$ of from 100 to 200 minutes, can be used as a source of alumina. Another aluminum trihydrate suitable for use in processes of the invention is that prepared by Wall U.S. 2,549,549. This type of product can have $\theta$ values as low as about 10 minutes.

Free water removal

The initial free water content of the alumina starting materials is immaterial. Dry, gelatinous, or wet and caked materials can be used.

However, it has been found that the high surface area esterified products of the present invention are most readily made when the water content of the conversion medium is kept below about 5% by weight. Because water is one of the reaction products formed when carrying out the conversion process of the invention, it is therefore desirable to remove free water in excess of about 5% by weight from the starting materials before conversion. This can conveniently be done in several ways.

The method used to remove free water depends upon the structural stability of the starting material. Pressure of water in the interior of starting material crystals has a profound influence upon the structural stability. For example, when the trihydrate starting material is in the form of a wet mass such as a filter cake, the starting material can usually be partially dried in air without increasing the particle size through irreversible aggregation. However, when water is completely removed from a product with a very small particle size, the enormous surface tension forces of the water in the fine capillaries between the particles tend to cause irreversible aggregation of the crystals on removal of free water.

In many instances, especially in the removal of free water from gelatinous materials, the gel structure shrinks or otherwise changes and irreversibly compacts during air or vacuum drying. Such changes are probably caused not only by compressive forces arising from surface tension in the fine capillaries but also by shrinkage and interparticle coalescence which takes place as water is removed from the interior of the trihydrate crystals.

In order to prevent shrinkage and interparticle coalescence during free water removal, and also during the subsequent dehydration and esterification, the preferred technique used is to displace the free water with a solvent, preferably a polar solvent. Suitable polar solvents include those containing one or more hydroxyl groups. Additional examples of polar organic solvents useful in the present process are ethers and ketones.

A substantially anhydrous trihydrate can be evaporated to dryness directly to produce a powder. Alternatively if a suitable polar organic solvent is used, the trihydrate can be further processed directly to the monohydrate without first being dried. Optionally, the solvent can be recovered by evaporation and recycled. Such a water displacement method can be operated as a continuous extraction process utilizing counter-current techniques to improve efficiency.

For example, a wet filter cake of alumina trihydrate can be washed thoroughly with acetone to displace the water, and the acetone-wet mass can then be dried to a powder, or further treated without drying, as preferred.

A second preferred method of removing water from wet starting materials utilizes azeotropic distillation and constant boiling liquid systems in which the free water content remain at tolerable levels.

The technique to be used in a particular instance for free water removal depends upon such factors as the type of alumina starting material selected, the type of alumina product desired, the dehydration and structural transformation procedure to be used.

Generally speaking, however, those forms of alumina which form dense, hard masses when dried from water, are preferably dehydrated by washing or extracting with a water-miscible organic liquid having a water-rich azeotrope, such as normal propyl alcohol. Where shrinkage to dense but friable masses occurs upon drying from water, azeotropic dehydration can be carried out with organic liquids which are only partially miscible with water, such as normal butyl alcohol. Where shrinkage of the substrate upon drying from water is not a serious factor, but the finely divided state of the powder makes it difficult or undesirable to dry by ordinary means the azeotropic dehydration may be carried out by distillation with a water-immiscible liquid such as kerosene.

The presence of extraneous materials, other than water, is also to be avoided. Large amounts of acids, and alkalis are particularly undesirable because they affect the stability of the reactants and products. Washing will remove such soluble extraneous materials. Any remaining acid or alkali can be rendered relatively harmless by adjusting pH to the range of about 2 to 9 and preferably to the range of 5 to 8 just before free water removal.

One method I use to determine the pH of the alumina is to slurry approximately 4 grams of alumina in 25 ml. of distilled water and then take the pH of the resulting slurry with a pH meter.

Preferred starting materials, of course, are those which do not need to be initially dried before being dehydrated and esterified. An example of a preferred starting material is Bayer hydrate and a grade of alumina trihydrate designated as C-730 by the Aluminum Company of America.

However, if it is necessary to use a wet, gelatinous trihydrate starting material it is preferred to combine the free water removal step with the dehydration-esterification step. This can be done, for example, by immersing the trihydrate starting material in an alcohol and then azeotropically distilling off free water from the trihydrate starting material. Then after sufficient free water has been removed, the system can be immediately used in the dehyration-esterification step without changing the alcohol used for the azeotropic distillation. Thus, in effect, the same alcohol can be used for the esterification-dehydration step.

*Dehydration and esterification*

Generally speaking, a dry crystalline alumina trihydrate starting material can be converted to an alumina monohydrate product by heating it in a thermally stable, non-reactive liquid, vapor or gas.

However, the high surface area organophilic and hydrophobic monohydrate products of this invention are made by heating dry trihydrate starting material in a medium containing an alcohol. This material appears to serve two important functions simultaneously:

(1) It physically supports the alumina crystal lattice so as to prevent shrinkage and interparticle coalescence during dehydration of the trihydrate to the monohydrate form, as explained earlier in the section on free water removal.

(2) It chemically coats the surface of the alumina monohydrate crystalline products by chemically reacting with substrate surface hydroxyl groups so as to give the products their organophilic and hydrophobic character as further described below:

The amount of heat applied to the mixture of alumina trihydrate starting material(s), esterification agent(s), and any diluent(s) used, depends upon the particular type of starting material involved and upon the liquid or vapor employed. The reaction can be carried out in either the vapor or liquid phase, but usually liquid phase systems are used and autogenous pressures employed.

Suitable starting materials include alcohols and ethers. However, preferred esterification agents are alcohols containing but one hydroxyl group per molecule and also having straight carbon chains bearing between 3 and 10 carbon atoms. Preferably the hydrocarbon chain is alkyl.

Examples of normal primary straight-chain, unsubstituted aliphatic alcohols are methyl, ethyl, n-propyl, n-butyl, n-amyl, n-hexyl, n-octyl, n-nonyl, n-decyl, n-undecyl, n-dodecyl (lauryl), n-tetradecyl (myristyl), n-hexadecyl (cetyl), and n-octadecyl (stearyl).

Examples of primary branched chain, unsubstituted aliphatic alcohols are isobutyl, isoamyl, 2,2,4-trimethyl-1-hexanol, 5,7,5-trimethyl-2-(trimethylbutyl)-octanol.

Examples of secondary unsubstituted aliphatic alcohols are isopropyl, sec-butyl, 2-pentanol, 2-octanol, 4-methyl-2-pentanol and 2,3-dimethyl-3-pentanol.

Examples of alicyclic alcohols are cyclobutanol, cyclopentanol, cyclohexanol, and cycloheptanol.

Examples of alcohols having ethylenic unsaturation are allyl, crotyl, oleyl (cis-9-octadecen-1-ol) citronellol, geraniol.

Examples of araliphatic alcohols are benzyl, 2-phenyl-ethanol, hydrocinnamyl and alphamethyl-benzyl.

Acetylenic saturation is illustrated by propargyl alcohol, and an example of an alcohol containing both aromatic and ethylenic unsaturation is cinnamyl.

The alcohol molecules used for esterification can contain more than one functional group. However, the additional functional groups present should not be a type that will promote condensation, polymerization, or coalescence of product particles. Certain functional groups are found to affect the characteristics of the products and impart to them novel and useful properties.

The type of alcohol used for the dehydration and esterification can vary within wide limits. In fact, almost any source material for alcohols can be used in the reaction medium provided only that such source material will liberate alcohol under reaction temperatures and pressures without causing any excessive, unwanted side reactions. Thus, ethers can be included among suitable starting materials along with alcohols. The alcohols used during dehydration and esterification can further vary within wide limits. The alcohols used can, in general, contain from 1 through 18 carbon atoms per molecule. In fact, the upper limit of the number of usable carbon atoms per molecule is actually dictated by practical considerations such as costs and the fact that increase in carbon chain length usually requires correspondingly greater reaction times in order to accomplish esterification of monohydrate substrate surface. The alcohol used can be further substituted by non-reactive radicals such as fluorine.

An inert, thermally stable solvent or diluent can be used. Such solvents or diluents are particularly useful in order to control the extent of esterification, and, to a lesser extent, the degree of increase in surface area and decrease in particle size products. A particular advantage in using a solvent is found in the ability of such a medium to uniformly distribute the esterification agents over the alumina surface during dehydration and esterification.

Suitable solvents and diluents include toluene, xylene, kerosene, benzene and heptane.

Mixtures of various esterification agents can be used with the result that different hydrocarbon groups can be substituted on the same platelet substrate surfaces. Such surfaces can often be coated more densely with hydrocarbon particles by using mixtures of esterification agents. For example, if a long chain alcohol and a short chain alcohol together are used as esterification and structural transformation agents, it is believed that the alternate long rows and short rows and hydrocarbon radicals are substituted on the surface of substrates. Because of the rotation of the free ends of the hydrocarbon radicals the shorter carbon chains are believed to fit in between the longer chains and to allow for a greater "packing" of hydrocarbon groups upon substrate surfaces. An example of a mixture of different esterification agents is n-octanol with methanol.

During the dehydration and esterification, water will appear as a by-product. This water comes from three sources: (1) the free water loosely associated with the alumina trihydrate starting material and possibly not previously separated from it; (2) the water of hydration (as hydroxyl groups) chemically bonded to alumina and liberated during the conversion of trihydrate to monohydrate; and (3) the water created by the surface esterification of alumina substrate. In order to obtain high surface area and to control the extent of esterification, it is necessary to keep the free water content of the reaction system at tolerable levels. While no critical water level is known above which esterification and structural transformation will not take place, it has been found that a low water content of the reaction system promotes a higher degree of alumina crystal transformation and surface esterification in shorter periods of time. For these reasons it is preferred, as when removing free water from the starting materials as described earlier, to keep the free water level of the reaction system below about 5%.

To maintain a low water content in the reaction medium throughout the dehydration and esterification operation, it is necessary to effectively remove enough water formed to always keep an economical, practical rate of transformation and esterification taking place. One means of maintaining such a low water level is to use water-miscible liquids which are present in sufficient quantities to prevent the concentration of water in the system from reaching intolerable levels. The amount of water-miscible liquids used for this purpose can be calculated by reference to the water-miscibility of the particular liquid used and to the total amount of water which will be liberated during the dehydration-esterification operation.

Another means of maintaining the low water content is to place suitable drying agents into the reaction system which will effectively take up and hold sufficient water to maintain a preferred tolerable water level. Aluminas are preferred drying agents. For example pelleted gamma alumina can be used.

For some systems the temperature of the reaction can be as low as 100° C. but more usually is in the neighborhood of 200° C. In the interest of minimizing the time necessary for effecting conversion and esterification, temperatures of about 250° C. are preferred as a lower limit. The upper limit is usually determined solely by practical considerations such as the decomposition temperature of esterification agents or diluents, apparatus limitations, and to a much lesser extent, by the particular type of monohydrate product desired. Usually the upper limit of the reaction temperature will be no higher than about 350° C.

If a high-boiling azeotropic mixture is used in the conversion medium, it is possible to maintain the water level at tolerable levels by continuously distilling off water formed and also it becomes possible to combine the free water removal step earlier described with the dehydration-esterification step.

The preferred technique of dehydration and esterification utilizes a medium of organic liquids or vapors under autogenous pressures and contains not less than 5% by weight (based on the amount of alumina present) of an alcohol of the type described earlier in more detail.

To make a product having strong hydrophobic and organophilic properties a large concentration of alcohol must be present in the reaction medium. Further, a high concentration of esterification agent facilitates reaction. In general it is preferred to have sufficient alcohol present to effectively wet all surfaces of the starting material and to keep monohydrate substrates in close contact with esterification agents at all times during dehydration-esterification process. For handling reasons it is usually best to use sufficient alcohol together with any diluent employed so that a slurry of materials is formed. The actual volume of liquid materials employed, however, is not critical except insofar as considerations of maintaining low water concentration are involved.

While the products of this invention have a surface area at least 50 square meters per gram, it is preferred to continue the process of affecting the shape whether with an alcohol or another liquid or gas until the surface area as measured by nitrogen absorption is at least doubled in comparison to that of the starting material. It is preferred to double the surface area in order to gain a high order of conversion efficiency from the instant process for economic reasons.

The time needed for esterification-dehydration operation can vary within wide limits being dependent upon a number of variables. While reaction temperature is a principal factor in determining the total reaction time required, other factors also affect this time, such as the point when equilibrium is reached, the type of alumina trihydrate starting material employed, the extent and the type of esterification desired, the surface area desired in the product, and like considerations. Factors governing esterification include the concentration and type of alcohols and diluents used (shape, carbon chain length, functional groups, etc.). In general, short carbon chain lengths permit more rapid and complete esterification at given temperature and pressure conditions than longer chains. Large and more highly branched structures are responsible for varying amounts of stearic hindrance.

Usually not less than 30 minutes nor more than 10 hours are required to accomplish a reasonable degree of dehydration and esterification. More usually, however, the time required will range between ½ and 4 hours.

One method of determining the extent of esterification per unit area of surface is to utilize infrared radiation. In this method a sample of surface esterified alumina monohydrate is hydrolyzed in a caustic solution. Then the alcohol formed is separated from the reaction mixture by steam distillation and then extracted from the distillate with carbon tetrachloride. This extraction is not quantitative because equilibrium conditions are involved; however, the extractions can be reproduced with a high degree of precision. The amount of alcohol is then determined by an infrared method using an empirical calibration (cf. J. J. Kirkland, Analytical Chemistry, vol. 27, p. 1537, October 1955).

After the desired equilibrium has been reached, or whenever it is desired to stop the dehydration-esterification, the reaction vessel can be depressurized (if autogenous pressure has been employed) and the solid product removed from the excess esterification agent. The most convenient means of removing excess esterification agent and any diluent employed is to vent volatile materials (if such have been used) while the reaction vessel is still under high temperature and pressure. While it is possible to heat the reaction mixture under pressure to above the critical point for a short period of time and then vent to remove volatile material from the product, the high temperatures employed must be carefully regulated in order to avoid decomposition of solid reaction product.

The preferred method of separating reaction products from reactants is to evaporate excess reactants and solvents with continued application of heat to an opened reaction vessel. Esterification agents which distill readily at atmospheric pressure and without decomposition can be removed from the product simply by distillation or evaporation using an oven-drying technique or the like. Sometimes the reaction vessel can be flushed with an inert gas to remove any remaining vapors. A vacuum can occasionally be applied to obtain the same effect.

Since long carbon chain materials are not readily distilled except under a high vacuum, it is more convenient to remove an excess of such material by extracting it with a low-boiling solvent such as methyl ethyl ketone, chloroform, ether or the like. The surface esterified alumina monohydrate product can be separated from this extraction medium readily by filtering or centrifuging. After the higher alcohol, for example, has been completely removed, any excess solvent remaining can be evaporated from a product leaving a dry powder.

Instead of removing excess alcohol after the reaction, part or all of the material can be left in the products for some uses and additional quantities of alcohol or other liquids can be added without drying the products. Thus, an esterified product can be incorporated as an alcoholic slurry directly into liquid or solid compositions of matter, so that the esterified product is never recovered in the dry state. Also, the products can be compressed from the alcoholic slurry, either with or without the addition of a binder, to give pellets, bricks, or other shapes or forms of solids. It will, therefore, be understood that modifications of this kind or their equivalent are within the spirit and scope of the invention.

Products

The particles of this invention have at least one dimension in the colloidal size range and have a specific surface area between 50 and 600 square meters per gram.

Photomicrographs, e.g. at 5,000–50,000×, disclose that the substrate particles appear to be hexagonally sided and flat-faced. The particles have a plate-like or flaked appearance and are very thin.

The alumina monohydrate platelets of the invention have the characteristic X-ray diffraction pattern of boehmite. This is shown in the ASTM diffraction data card 2–0129.

In obtaining X-ray diffraction patterns on the products of this invention, the samples are first dried by air drying, by azeotropic dehydration and venting from organic solvents, or by freeze drying. They are then mounted in aluminum sample holders ¾" long and ⅜" wide. They are exposed to copper, $K_\alpha$ radiation of wavelength 1.54 A. units which have been filtered through a nickel filter.

In examining the X-ray diffraction pattern of products of the invention there will be found line positions and line intensities somewhat unlike the ASTM diffraction data card above mentioned. This is to be expected since the products are synthetic and, though of the same crystal structure as the alumina of boehmite found in nature, there are differences in impurities and possibly in precise arrangement of crystal lattice. In any event, however, one skilled in the examination of X-ray diffraction patterns would conclude from the X-ray diffraction pattern of products of the invention that they, like synthetic boehmites previously produced, are of the same crystal structure as the alumina represented by ASTM diffraction data card 2–0129.

In physical appearance the products are powders, although in some instances they can be in the form of lumps or cakes which are easily pulverizable under the pressure of the fingers or by a light rubbing action. In some instances the products obtained are in the form of exceedingly fine, light, fluffy powders, some of which are so mobile and free-flowing that they behave very much like fluids.

The particles remain separate and are readily pulverulent, easily friable and readily redispersible in organic media. Surface esterification undoubtedly contributes to the capacity of the particles to remain separate and to be easily dispersible.

Figure 2:
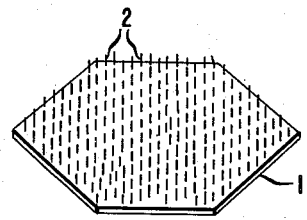
Figure 2 shows an artist's schematic conception of the appearance of individual ultimate particles of the invention densely reacted with hydrocarbon groups.
Figure 3:
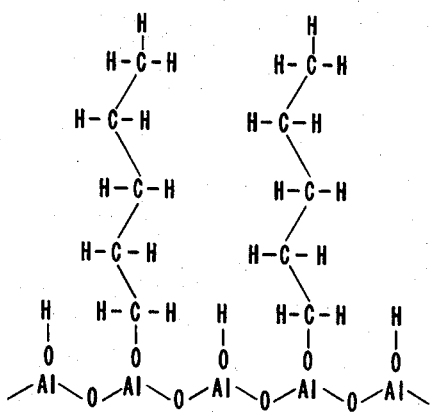
Figure 3 is a diagrammatic sectional illustration of a surface portion of a particle of Figure 2 showing surface hydrogen atoms of the crystalline structure replaced by amyloxy radicals. Because of difficulties of third dimensional representation, this drawing is only schematic.

Now follows a detailed description of the appearance of individual ultimate particle of the invention with reference to Figures 1, 2, and 3. The particle has been partially esterified and so is sparsely covered with hydrocarbon groups. Each particle consists of a substrate 1 to which are affixed in pincushion fashion hydrocarbon groups 2. In accord with known data, the substrates in both Figure 1 and Figure 2 are shown as thin, hexagonally-shaped flat-faced solids. Since alcohols tend in general to esterify only the flat faces of the substrate particles, no hydrocarbon groups are shown attached to the edges of the substrate crystal particle.

Figure 2 shows an artist's conception of the appearance of the individual ultimate particles of the invention densely coated with hydrocarbon groups. As is also the case with Figure 1, while individual hydrocarbon groups would never be seen, it is most probable that the hydrocarbon groups evenly coat exposed surfaces of substrate particles and are spaced at regular intervals from one another.

Figure 3 shows diagrammatically the manner in which surface esterification is believed to take place with pentyl alcohol. In this particular case, the substrate surface is shown to be densely coated with hydrocarbon radicals.

The measurement of the specific surface area of products and starting materials can be determined according to the method of P. F. Emmett, "A New Method for Measuring the Surface Area of Finely Divided Materials and for Determining the Size of Particles," Symposium on New Methods for Particle Size Determination in the Subsieve Range, page 85, published by the American Society for Testing Materials, March 4, 1941.

When the surface of the alumina monohydrate particles has been esterified so as to contain hydrocarbon groups, such added groups are chemically bound rather than physically absorbed or coated on the surface of the alumina. That such hydrocarbon groups are chemically bound to the surface of the alumina-monohydrate substrate is demonstrated by the following evidence:

(1) The alcohols used for esterifying cannot be desorbed even under very high vacuum and relatively high temperatures in contrast to absorbed alcohols which are readily removed in this manner.

(2) The esterified products are temperature stable and may be heated to at least 100° C. under a high vacuum of 10 to the minus 5 millimeters of mercury pressure for one hour or more.

(3) Water is produced when alcohols are heated with alumina monohydrate particles.

(4) The alkoxide groups cannot be removed by washing with hot methylethyl ketone or similar solvents, or by prolonged extraction in a Soxhlet extractor. No alcohol is displaced from the alumina by treatment with such liquids, in contrast to the displacement of one solvent by another, which is observed in the case of ordinary physical adsorption.

(5) Physically adsorbed alcohols do not render the surfaces either organophilic or hydrophobic and such adsorbed materials can be removed by subjecting the material to high vacuum and relatively low temperatures.

(6) Before esterification, substrate particles are hydrophilic, but after the processes, the particles become organophilic in that they have an affinity for organic liquids and are readily wetted by them.

If the esterified products of the invention are not esterified to the fullest extent possible, the powder product, if hydrophobic, is usually organophilic. Simple tests to determine whether surface esterified alumina monohydrate of the present invention is hydrophobic or organophilic can be carried out as follows:

The powder is slurried at least twice with an excess of warm methylethyl ketone and filtered to remove alcohol not chemically reacted with alumina surface. It is then dried at 75° C. in a vacuum oven for about 24 hours. (For esterified products containing an excess of the lower alcohols, the preliminary solvent extraction is not necessary since the excess alcohol is evaporated off in the drying.) The dry powder is passed through a 200 mesh screen. A ¼ cc. sample of the powder is added to 10 cc. of distilled water at room temperature in a 30 cc., 6 in. long test tube. The tube is stoppered and given about five vigorous vertical shakes. The alumina material which has not wetted into the water (e.g., if floating on the surface) and does not wet into water after standing for 15 minutes, is considered to be hydrophobic. Then 10 cc. of normal butanol is added to the test tube, and it is again stoppered and given five vigorous vertical shakes. It will be seen that the butanol forms a separate layer which floats on the water. The aluminous material which rises above the interface and passes into suspension in the butanol layer upon gentle stirring is considered organophilic according to this test. (If an emulsion results upon shaking, it may be broken by gentle agitation with a glass stirring rod or by allowing the mixture to stand for as much as one-half hour, if necessary, to complete the test.)

There is a correlation between the number of ester groups present per unit surface area and the organophilic and hydroxylated properties of the products of this invention. A certain minimum number of ester groups per unit surface area makes the products organophilic. As this number is increased, the preference for organic solvents increases. At a much higher concentration than the minimum, a second significant change occurs, and the products are not only highly organophilic but they cease to be hydrophilic. They are hydrophobic. They not only exhibit a preference for the organic solvent over water, but even in the absence of organic solvent they refuse to enter the water.

The degree of surface esterification can also be determined directly by determining the carbon content of the product and measuring the surface area of the substrate by nitrogen adsorption, and calculating the carbon as ester groups per unit area.

This calculation is made in terms of the number of ester groups per one hundred square millimicrons of external surface. The esterification value, E, is the number of —OR groups per one hundred square millimicrons of surface area, and is calculated from the expression:

$$E = \frac{(6.02)(10^{23})(C)}{(12)(n)(S_n)(10^{18})} = \frac{(50200)(C)}{(n)(S_n)}$$

where C is the weight of carbon in grams attached to 100 grams of aluminous substrate, n is the number of carbon atoms in the —OR groups, and $S_n$ is the specific surface area in m.²/g. of the aluminous substrate as determined by nitrogen adsorption.

Another means of determining the hydrocarbon content of the product utilizes infrared measurement.

To render the products markedly organophilic, it is necessary to have at least 10 hydrocarbon groups per one hundred square millimicrons of platelet surface. Usually not more than 400 hydrocarbon groups per one hundred square millimicron of surface area are present.

Uses of the products

The products of the present invention can be used as fillers and extenders and they can be used as catalyst bases. When used as fillers and extenders, the products can be used in compositions having a very wide variety of uses to give ultimate products possessing a number of desirable properties, such as improved physical properties, anti-aggregation tendencies, more uniform covering power, heat stability, and the like.

When used as catalysts, the products of the invention (after removal of the organic coating) are valuable because the tendency towards coking and plugging of pores in clinker-type, porous, high surface area alumina catalysts is eliminated. The problem of plugging and also the problem of diffusion of reactants into catalyst pores is eliminated because all the surface is external.

The use of the products of the present invention as fillers and extenders will now be discussed in detail and subheadings will be used for clarity in presentation.

Lubricants

Esterified alumina can be mixed with one or a combination of dry lubricants, for example, graphite, molybdenum disulfide, talc, powdered mica, and the like.

Esterified alumina can be mixed with volatile oils, for example, kerosene, gasoline and naphtha, or with organic solvents such as benzene, carbon tetrachloride, etc. to thicken the liquid phase.

Liquid lubricants containing esterified alumina have many advantages. Greases can be made by thickening lubricating oil with esterified alumina monohydrate. These greases show good shear stability and improved water resistance, and do not melt at elevated temperatures. For this purpose, a high surface area material is desirable.

The action of the esterified alumina is pronounced even in small amounts and excellent greases can be made using less than 18% of the esterified alumina. Sometimes it is possible to use as high as 70% of the esterified alumina in a grease composition though it will ordinarily be found that a smaller amount is adequate. The mixing of the oil and esterified alumina is carried out in any manner which has heretofore been used in the art for introducing other non-soap thickeners into oil or other lubricant compositions.

When added to oils in smaller amounts than sufficient to thicken the oils to greases, say 0.1 to 3%, esterified alumina gives compositions which show much less change in viscosity with temperature than as oil alone over a wide range of temperature.

Glycol, glycerine, castor oil, alcohol, polyethylene oxide oils, hydrocarbon oils, silicone oils, and other liquid components of hydraulic fluids can be thickened with esterified alumina monohydrate to any desired degree and retain their viscosity over a wide temperature range.

*Elastomer compositions*

Esterified alumina can be incorporated into elastomer products in many stages of manufacture including the original formation of the polymer. The elastomer in which the esterified products are incorporated according to this invention may be rubber-like polymeric material. The term "elastomer" is in general a descriptive term for this class of product and may be regarded as an abbreviation for "elasto polymer" or "elastic polymer."

Particularly some of the elastomers included are butadiene copolymerized in various ratios with styrene, butadiene copolymerized in various ratios with acrylonitrile, polymerized butadiene, polymerized 2,3 - dimethylbutadiene, polymerized 2-chlorobutadiene, 1,3 - isobutylene copolymerized with isoprene, copolymers of butadiene and methyl methacrylate, butadiene copolymerized with methyl vinyl ketone, and various other copolymers of butadiene. The esterified material can be added to a latex dispersion of the elastomer.

Esterified materials may also be milled into silicone rubbers for strengthening and reinforcing agents. They may also be incorporated into organosilicon oils and low molecular weight intermediates which are subsequently polymerized to form silicone rubber.

When esterified alumina is employed in elastomers as described in the preceding few paragraphs, the amount like that of other fillers and the like, can range from about 1 to 30% by weight based upon the weight of the elastomer.

Esterified alumina can also be used in the rubber industry for incorporation into the latex used in impregnating tire cords and other textile materials. The esterified alumina improves the adhesion between the rubber and the textiles such as cotton, rayon, or nylon tire cord.

Incorporated into rubber cements esterified alumina gives a stronger bond and in effect gives a reinforced rubber adhesive. The esterified alumina also has the effect of reducing the tackiness of a dried cement coating which has value when, for example, regular cement is used in a ball milling or colloidal mill process.

*Plastic compositions*

Esterified alumina is advantageous in organic polymer products when used in relatively large quantities as reinforcing filler, particularly in transparent or translucent organic polymers which have a refractive index near that of the esterified alumina monohydrate. This permits the preparation in some cases of almost transparent molded bodies and sheet products containing a high percentage of inorganic filler without practical loss of strength. The esterified materials may also be used with a variety of other fillers, including wood flour, diatomaceous earth, carbon black, clay, cellulose block, and other conventional filler materials.

The term "organic polymer" is used to include both natural and synthetic polymeric materials. Organic polymers adapted to be compounded with esterified materials include: Coumarin resins, indene resins, acetylene polymers, including their halogenated derivatives, olefin hydrocarbon polymers, including polymers of ethylene and butadiene, olefins-sulfur dioxide resins, petroleum resins, casein, ketone resins, urea formaldehyde type resins, melamine formaldehyde and furan resins, urea modified melamines, etc.

*Cleaning, polishing and protective coatings*

Esterified alumina can be incorporated into cleaners and polishes for metals, such as conventional silver polishes, chrome finish cleaners, and rust removers. The esterified alumina acts as a dispersing agent for the cleaner-abrasive, such as diatomaceous earth, volcanic ash, finely divided aluminum oxide, Carborundum, titanium dioxide, and iron oxide. The esterified alumina also disperses oils in oil-water emulsion type cleaners.

*Compositions finding use in the metal industry*

Refractories can be made containing esterified alumina by combining the latter with finely divided oxides of metals. The esterified alumina can be mixed with organic binders, with organic soluble metal salts such as aluminum acetate, or metal stearate, and compressed to form bodies before firing.

Esterified alumina can be incorporated into all types of wire insulation, including rubber, neoprene, polyethylene, chlorinated polythene, "Teflon" (a Du Pont trademark for its tetrafluoroethylene polymer), polyvinyl chloride, polyvinyl acetate, silicone resins, etc.

*Compositions finding use in textile and fiber industries*

Esterified alumina can be incorporated into organic fibers prior to drawing and spinning, in amounts ranging from a trace, up to high percentages, depending on the desired effects. Examples include use of the product of this invention in "Orlon" (a Du Pont trademark for its acrylic fiber polymer), cellulose acetate, polyvinyl chloride, polyethylene, rubber, "Teflon," neoprene and other synthetic organic compositions capable of forming threads or fibers. Esterified alumina can also be applied to the surface of fibers, not only synthetic but also natural fibers such as wool, silk, cotton, hemp, fur, feathers, goat hair, horse hair, and animal bristles generally.

Esterified alumina can be incorporated into textiles at any stage in the processing, from the initial separate fibers or monofilaments through the various stages of manufacture, to and including the finished textile product. Esterified alumina can be incorporated into organic fibers prior to drawing and spinning, in amounts ranging from a trace, up to as high as 50% depending upon the effects desired.

The incorporation of esterified alumina into synthetic textile fibers increases the dye susceptibility of the fibers especially toward acid, direct and mordant dyes. This incorporation is particularly important in nylon, "Orlon," and "Dacron" (a Du Pont trademark for its polyester fiber polymer), which are normally rather hydrophobic, and the incorporation of quantities ranging from 1 to 25% in these polymers improves the rate of dyeing.

*Paper manufacture*

Esterified alumina may be applied to paper in the beater, particularly in combination with paraffin waxes, utilizing the esterified alumina as dispersing agents. Sizes for paper, to be used either in the beater or in the size tub, can be improved by the addition of esterified alumina, particularly where the latter are used as dispersing agents for the wax, resin, or paper sizing agents. Sizes of the type utilized to give improved wet strength, including phenyl formaldehyde emulsions, and alkyd resin emulsion, are improved by the incorporation of esterified alumina which supplies additional dispersing action and at the same time improves adhesion of the cured resin to the paper fibers.

*Finishes*

Esterified alumina can be impregnated into the surface of wood, particularly with a resin binder such as urea formaldehyde to give usually hard surface finishes. In paints, lacquers, and varnishes, for application to wood surfaces, the esterified alumina can be incorporated to give improved adhesion to the wood. Incorporated into floor varnishes, the esterified alumina reduces slipperiness and improves hardness and durability.

Ceramic slips may be thickened by the inclusion of esterified alumina into the composition. Glazes, particularly those utilizing small amounts of organic binders, are improved by the addition of a small proportion of an esterified alumina which prevents sagging of the coating during drying.

*Petroleum manufacture*

Esterified alumina may be used in drilling muds, particularly where a very thick mud must be used which must later thin out during use.

Cracking catalysts may be made from esterified alumina, in view of the high surface area. It may also be used in combination with other catalytic materials such as silica, and small amounts of promoters such as potassium and iron oxide.

Adsorbents made from esterified alumina have especially advantageous properties. For this purpose, the esterified alumina can be used to separate small amounts of oil from waste waters by adsorbing the oils on the hydrophobic surface.

*Miscellaneous uses*

Pesticide products are improved in many ways by the incorporation of esterified alumina. An excellent application of esterified alumina is exemplified by its use as diluent and extender and anti-caking agent for powerful pesticides and herbicides such as methoxychlor, DDT, monuron, and others. They can also be used either alone or along with very cheap extenders, such as low density clays, diatomaceous earth, or wood flour.

Thermal insulation of low density and high thermal resistance can be made from esterified alumina bonded with small amounts of inorganic or organic adhesives, or just used alone with no binder. Such insulation is particularly advantageous in refrigerators.

Partially esterified dispersible aluminas when combined with tobacco markedly improve the mildness of cigarette, cigar, and pipe tobacco. The dispersible organophilic high specific surface area aluminas are especially advantageous since they can be incorporated into the humectant (e.g. glycerine) and sprayed on the tobacco. This completely eliminates the need for special filter tips which can easily clog. The alumina adsorbs organic constituents in situ and drops off with the ash.

Because of the fineness and organophilic character, cosmetics are improved by the addition of esterified alumina. Greases, salves, creams, cosmetic emulsions, hair oils, lipstick, face powder, antiperspirants, deodorants, and theatrical makeup materials may be improved by the incorporation of esterified materials, where the thickening and dispersing action of these unique materials play a role.

Inks, such as printing inks and lithographing inks, are vastly improved by the incorporation of esterified products, and as thickening agents and bodying agents.

Floor waxes for wood floors, as well as linoleum, are improved by the incorporation of esterified products. For example, wax emulsions can be prepared by methods described in the art utilizing the conventional components of floor waxes, such as carnauba wax.

The term "wax" as used herein will be understood to include not only the naturally occurring materials composed largely of fatty acid esters of high molecular weight monohydric alcohols such as carnauba, candelilla and beeswax, but also organic water-insoluble materials which have the physical character of waxes. This is in accord with the general usage in the art as is illustrated in an article entitled "Waxes in Industry—1" by A. H. Woodhead, in Paint Manufacture, volume 17, page 40 (1947).

This application is a continuation-in-part of my earlier application Serial No. 668,681, filed June 28, 1957, now abandoned.

In order that the invention can be better understood, the following examples are given:

*Example 1.*—The starting material used for this preparation is a commercially available gelatinous aluminum hydroxide of a type which is commonly used for the adsorption of viruses and has a theta value of less than one minute. In particular, this gelatinous aluminum hydroxide is obtained from Eimer and Amend (No. A-583) and chemical analysis shows that it contains 15.24% $Al_2O_3$, 84.72% loss on ignition, and 0.046% chloride. X-ray analysis of this material shows that it contains small particle size Gibbsite and probably some amorphous alumina. An electron micrograph of this material at a magnification of 25,000 diameters shows that it is composed of very small particle size ultimate particles which consist of loose aggregates of about 1 micron. The pH of a water slurry of this material is 7.0.

In place of n-propanol, the following alcohols can be used as esterification agents in this example:

Methanol, n-amyl alcohol, n-hexanol, n-nonyl alcohol, n-dodecyl alcohol, n-octadecyl alcohol, isobutyl alcohol, isoamyl alcohol, 4-methyl-2-pentanol, cyclohexanol, benzyl alcohol and propargyl alcohol.

In order to remove the water from this gelatinous aluminum hydroxide cake it is azeotropically dehydrated with normal propanol. In order to do this, 20 grams of this aluminum hydroxide is slurried in 400 ml. of normal propanol in a 1 liter three-neck round bottom flask fitted with an agitator, thermometer, condenser, and receiver. It takes approximately 1 hour to reach a boiling point of 97.5°, which is the boiling point of normal propanol.

The normal propanol slurry at this point contains 0.91% $Al_2O_3$ and 0.21% water.

In order to react the normal propanol with the alumina, as well as to remove the excess normal propanol, this slurry of alumina in normal propanol is next heated to 300° C. in an autoclave and then vented. The heat-up time to reach 300° C. is approximately a half an hour at which time pressure rose to about 900–1000 p.s.i.g. At this point the bomb is opened and the normal propanol vapors were removed and condensed. The autoclave is then closed, cooled and the contents removed.

The product is a white and very fluffy powder which appears dry to the touch and is hydrophobic as evidenced by the fact that it floats on water and is not wet by it. In order to insure that all physically adsorbed alcohols have been removed from the alumina, it is next dried under high vacuum at 110° C. for 16 hours. After vacuum drying, it is found that the white powder is stilll very hydrophobic and still floats on water.

Chemical analysis of this alumina powder shows that it contains 71.58% $Al_2O_3$, 21.4% loss on ignition, 10.96% carbon, and 2.57% hydrogen. This corresponds to 3.5 propoxy groups per sq. millimicron. The specific surface area as determined by nitrogen adsorption is 530 sq. meters per gram which is one of the highest which has been reported for a boehmite alumina. X-ray analysis of the dry powder shows that it is small particle size boehmite. Electron micrographs of this material dispersed in butanol show that it is composed of loose, open aggregates about 2 or 3 microns in diameter, the ultimate particles of which are very fine.

*Example 2.*—This is an example of the esterification of a commercially available alumina trihydrate which, upon esterification transforms to plate-like alumina having the boehmite crystal structure and a high surface area.

One hundred grams of Alcoa alumina trihydrate Grade C-730 is mixed with 400 gms. of n-butanol. The C-730 has a specific surface area of less than 10 m.²/g. and a theta value of 10 minutes. The small amount of water in this mixture is azeotropically removed. This dispersion is then heated in an autoclave for 1 hour at 300° C. The butanol vapors are vented off and the autoclave sealed and cooled to 50° C. before dry nitrogen gas is admitted and the autoclave opened.

The product has a surface area of 88 m.²/g. and electron microscopic examination shows that it consists of platelets.

The percent carbon is 1.48 which corresponds to a degree of esterification of 2.1.

This material is milled into silicone rubber and used as a reinforcing filler. One hundred parts by weight of General Electric silicone gum Batch #X–2246 is used with 50 parts by weight of the filler and three parts by weight of benzoyl peroxide.

The milled stock is white and soft. It is press cured for 25 minutes at 116° C. and then oven cured 24 hours at 400° F.

This stock has improved tensile and elongation properties compared to a rubber filled with the C–730 alumina.

The size of the particles is such that the ratio of the two larger dimensions is between the values of 1:1 and 5:1 and the ratio of the smallest to the next largest dimension is less than 1:10.

In place of n-butanol there can be used as esterification agents the following alcohols: methanol, n-propanol, n-hexanol, n-decyl alcohol, n-tetradecyl alcohol (myristyl alcohol), n-octadecyl alcohol, isobutyl alcohol, 2,2,4-trimehyl-1-hexanol, 2-pentanol, 2-octanol, 2,3-dimethyl-3-pentanol, cyclohexanol, crotyl alcohol, oleyl alcohol, geraniol alcohol and alpha-methyl-benzyl alcohol.

Example 3.—This is an example of the esterfication of Alcoa's alumina trihydrate C–730 in the presence of gamma-alumina which absorbs the water produced when the alumina trihydrate transforms to boehmite as well as when it reacts with the alcohol producing an esterified surface.

Five gms. of Alcoa's alumina trihydrate C–730 and 75 gms. of Harshaw's gamma-alumina catalyst AL–0104T ⅛" in the form of white, hard, uniform pellets are mixed with 400 gms. of n-butanol. The reaction mixture is heated to 300° C. and held at this temperature for 1 hour before the n-butanol vapors are vented. After venting, the autoclave was closed and cooled to 50° C. before dry nitrogen was admitted and the autoclave opened to the atmosphere. After opening the autoclave and separating the α-alumina pellets, the product is found to be white fluffy powder and partially hydrophobic, even after vacuum drying for 70 hours at 90° C.

The sample contains 2.80% carbon and a specific surface area of 181 m.²/g., which corresponds to a degree of esterification of 2.0

The size of the particles is such that the ratio of the two larger dimensions is between the values of 1:1 and 5:1 and the ratio of the smallest to the next largest dimension is less than 1:10.

Example 4.—10 g. of a crystalline alumina trihydrate Alcoa grade C–730 having a theta value of 10 is slurried with 1½ pounds of C.P. normal butanol. This slurry is placed in a stainless steel autoclave; the air in the autoclave is flushed out dry nitrogen and the autoclave is sealed and heated to 300° C. This temperature is maintained for ½ hour. The autoclave is then cooled to room temperature and the white product is vacuum dried overnight at 110° C. The product had a specific surface area by nitrogen adsorption of 246 m.²/g. at a percent alumina of 83%, the loss on ignition is 16.6%. The percent carbon is 4.1. This latter percent carbon corresponds to a degree of esterification of 2.1.

Example 5.—The starting material used is a crystalline aluminum trihydrate (Alcoa C–730) which is substantially anhydrous. Ten parts by weight of this are added to 500 parts by weight of diphenyl ether. The mixture is heated in a stainless steel autoclave for 1 hour at a temperature of 325° C. The mixture is cooled and discharged. A finely divided product is separated from the liquid and washed with ether. The product is suitable for use as a filler.

The claims are:

1. Colloidal surface-esterified alumina monohydrate platelets, such platelets having from about 10 to 400 hydrocarbon groups per 100 square millimicrons of surface area.

2. Organophilic colloidal surface-esterified alumina monohydrate platelets having a surface area between 50 and 600 square meters per gram and having from about 10 to 400 hydrocarbon groups per 100 square millimicrons of surface area.

3. An organophilic surface-esterified alumina monohydrate platelet having at least one dimension in the colloidal size range, a surface area between 50 and 600 square meters per gram, and a crystalline structure like that of boehmite as shown by X-ray diffraction patterns, each platelet further having its surface covered with from about 10 to 400 hydrocarbon groups per one hundred square millimicrons of surface area, each such hydrocarbon group containing from 1 through 18 carbon atoms and being attached to the aluminum through an oxygen linkage.

4. In a process for preparing surface-esterified alumina monohydrate platelets, the step of heating an alumina trihydrate characterized by having a time theta necessary to depolymerize one-half of such alumina in hydrochloric acid at 98° C. of less than 500 minutes with at least one alcohol containing from 1 through 18 carbon atoms per molecule so as to form hydrophobic colloidal surface-esterified alumina monohydrate platelets having a surface area between 50 and 600 square meters per gram and having from about 10 to 400 hydrocarbon groups per 100 square millimicrons of surface area.

5. The process according to claim 4 wherein the reactants are heated in the range of 90 to 300° C. for from 30 to 600 minutes.

References Cited in the file of this patent

UNITED STATES PATENTS

| | | |
|---|---|---|
| 2,657,149 | Iler | Oct. 27, 1953 |
| 2,744,074 | Theobold | May 1, 1956 |